(No Model.)
D. STRASSER & A. H. GERDOM.
BOTTOM BAR FOR WINDOW SHADES.
No. 328,905. Patented Oct. 20, 1885.
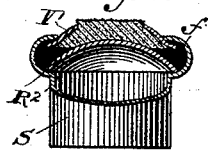
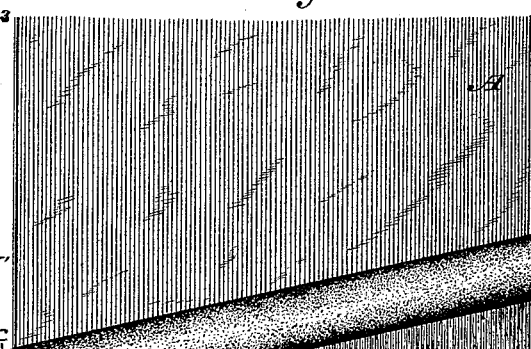
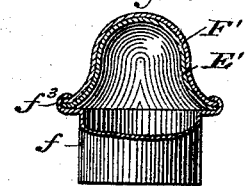
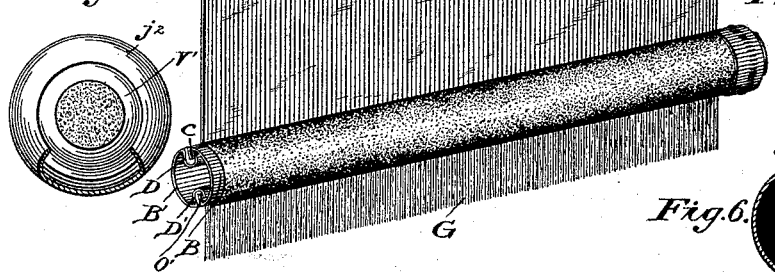
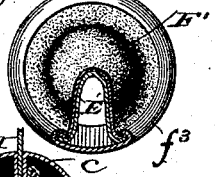
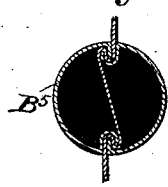
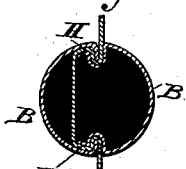
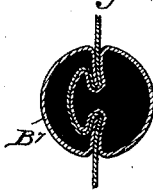
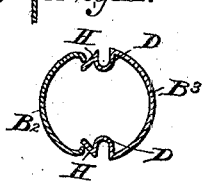
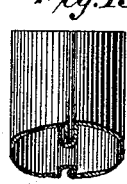
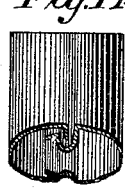
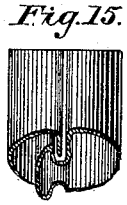
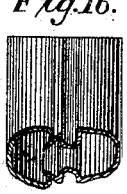
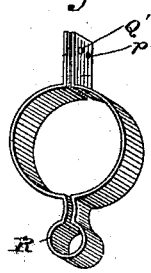
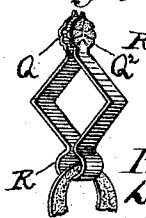
Witnesses.
H. W. Elmore,
Wm. J. Tanner
By their Attorney.
Inventors.
D. Strasser
A. H. Gerdom
John C. Lennie

UNITED STATES PATENT OFFICE.

DAVID STRASSER AND ANDREW H. GERDOM, OF ALBANY, NEW YORK.

BOTTOM BAR FOR WINDOW-SHADES.

SPECIFICATION forming part of Letters Patent No. 328,905, dated October 20, 1885.

Application filed July 9, 1885. Serial No. 171,095. (No model.)

*To all whom it may concern:*

Be it known that we, DAVID STRASSER and ANDREW H. GERDOM, citizens of the United States, residing at Albany, in the county of Albany and State of New York, have invented certain new and useful Improvements in Bottom Bars for Window-Shades and the Like; and we do hereby declare the following to be a full, clear, and exact description of the invention, such as will enable others skilled in the art to which it appertains to make and use the same.

Our invention relates to certain new and useful improvements in bottom-bar fixtures especially adapted for use in connection with window shades or curtains, but in part applicable also to other articles, as bannerets, wall-screens, hanging maps, and the like.

Referring to the accompanying drawings, illustrative of the invention, Figure 1 represents in perspective the main portion of our improved bar attached to a curtain or other like article. Fig. 2 represents in elevation and partial section one form of our proposed end cap. Fig. 3 represents a plan view of the same, partially broken away. Figs. 4 and 5 represent, respectively, like views of a modification of the end cap shown in Figs. 2 and 3. Fig. 6 represents a vertical central section, slightly enlarged, of the bar shown in Fig. 1, illustrating the manner of attaching said bar to the hanging fabric. Fig. 7 represents in cross-section a modification of the bar. Figs. 8, 9, and 10 represent similar views to that of Fig. 6 of modifications of the construction and mode of clamping shown in said latter figure. Fig. 11 represents in cross-section a similar construction to that shown in Fig. 9, the bottom-bar sections or parts being shown as separated before being sprung or slid into position. Figs. 12, 13, 14, 15, and 16 represent, respectively, full views, partly broken away, of the constructions shown in Figs. 7, 8, 9, 10, and 11. Figs. 17 and 18 represent perspective views of encircling bands adapted to surround the curtain-bar and support a pendent ring.

Similar letters indicate similar parts throughout the several views.

A indicates a curtain or other fabric to which the bottom bar is to be attached. In the form illustrated in Figs. 1 and 6 the bottom bar is composed of one or more longitudinal pieces, B B', of sheet metal or other substance having resilient qualities when shaped in the manner shown. These pieces are preferably made of metal, the piece B being provided with the longitudinal inwardly-projecting flanges C C', and the piece B' with the inwardly-projecting bent flanges D D'. The curtain fabric is clamped or fastened between the two pieces B B' of the bottom bar by placing such fabric loosely upon one of the pieces, and either springing the other over the first, which we deem preferable, or by inserting the end of one within the end of the other and sliding them upon each other until they form together a complete cylinder or other design. In either manner of clamping the bar upon the curtain the two will occupy the relative positions shown in Figs. 1 and 6, the fabric being clamped between the flanges of B and B', as therein illustrated. The curtain-fringe G extends below the bottom bar, contributing to the ornamental effect.

In Figs. 9, 11, 14, and 16 we have shown slight modifications of the construction of the clamping-flanges, longitudinal lips H H' being added to the flanges D D', and bent at such an angle that when the two pieces $B^2$ $B^3$ are sprung or slid together over the curtain fabric said lips shall exercise an additional clamping action upon the same, forcing it against the interior surface of the piece $B^2$.

In the construction shown in Figs. 8 and 13 the parts $B^4$ and $B^5$ are exact counterparts of each other, each having a straight and a curved flange. Both pieces may accordingly be made with a single die. The curtain is clamped between the flanges in the manner shown.

In Figs. 10 and 15 the straight flanges of the piece $B^7$ extend inwardly such a distance as to render it impracticable to spring them over the joined flanges of the piece $B^8$. In this instance, therefore, it is necessary to slide the pieces to place, as already described.

In Figs. 7 and 12 the entire bar is made from a single piece, D, so shaped that the curtain shall be clamped between the flanges H' I', the two being sprung together after the insertion of the curtain edge between them. In this case the lower edge of the curtain will be contained within the bar. The bar may also be bent, as shown, to form an inner cylindrical or otherwise shaped chamber, E, containing a longitudinal counterbalance-rod of metal or other heavy material, and upon which may be wound the body part of a separate fringe ornament, F, extending below the bar. Counterbalance-weights may also, if desired, be inserted loosely or fixedly within any of the bottom bars.

The devices for supporting the pendent ring are bent into shape from a metal blank and completely encircle the bottom bar, having two parallel lips or projections extending above the latter, between which lips or projections the curtain or other fabric is included. These lips are drawn together and fastened to the fabric by stitching, which, in the device shown in Fig. 17, passes through the holes $Q'$ $p'$, and in that shown in Fig. 18 by stitching passing through the fabric and around the lips of the band immediately below the shoulders $Q$ $Q^2$. The band is thus prevented from slipping from the bar when a downward strain is put upon said band in lowering the curtain. The stitching unites the band to the fabric with great tenacity. Each of the bands is provided with a subjacent recess, R, for the reception of a pendent ring.

The ends of the bar are closed by means of end caps or ferrules, two different forms of which are shown in Figs. 4, 5 and 2, 3. The former consists of a short tubular body-piece, S, having an annular enlargement, $f^3$, at its outer end. Through a central aperture in $f^3$ extends the button $V'$, resting upon the yielding spring-support $R^2$. The button $V'$ is either entirely of soft material—such as plush, rubber, or the like—or is faced or covered with such material. This feature of our invention prevents the end of the bar from denting or scratching the window frame-work.

In Figs. 2, 3 the end cap is made from a similar tube-section, $f$, having a like annular overlapping flange, $f^3$. From its end projects the cap-shaped piece $E'$, covered with a layer of soft material held in place between the flange $f^3$ and the piece $E'$.

The body of the bar may be covered with plush of selected colors, or may be either plain and highly polished or variously ornamented in other ways to suit individual taste or the demands of the trade. The pendent ring and its supporting device may be in like manner variously ornamented.

We are aware that it has been proposed to include the lower edge of a curtain between two sections of wood dovetailed together and sliding on each other; also, that a ferrule containing a rubber buffer projecting from its end has been employed upon a chair-leg. We do not claim such subject-matter.

Having thus described our invention, what we claim, and desire to secure by Letters Patent, is—

1. A bottom bar for window-shades and the like, consisting of a main body provided with interlocking spring clamping lips or flanges adapted to retain the edge of the curtain between them, substantially as shown and described.

2. In a bottom bar for window-shades and the like, the main body thereof divided into separate longitudinal portions provided with interlocking spring clamping lips or flanges, substantially as shown and described.

3. In a bottom bar for window-shades, the combination, with the main body thereof, of an inwardly-projecting straight flange and a bent flange, the two adapted to retain the edge of the curtain or other fabric between them, the whole being constructed of elastic or resilient material, whereby the two flanges may be sprung together and interlocked, substantially as described.

4. In a bottom bar for window-shades, the main body thereof divided into separate longitudinal portions, both constructed of elastic or resilient material and having inwardly-projecting interlocking flanges, two of the flanges being straight and the others bent, substantially as shown and described.

5. In a bottom bar for window-shades, the combination, with the main body thereof, formed of elastic or resilient material, of the inwardly-projecting straight lip or flange and a bent or curved flange, the latter having an auxiliary lip extending downwardly and outwardly therefrom, whereby the flanges may be sprung together and interlocked and the auxiliary lip clamp against the inner surface of the bar, substantially as shown and described.

6. In a bottom bar for window-shades, the combination, with the main portion thereof, formed from a single piece of elastic material, and having interlocking spring clamping-flanges, and the chamber E, of the counterbalance-rod and the fringe ornament attached to the same, substantially as shown and described.

7. In a bottom bar for window-shades, the combination, with the main portion thereof, formed from a single piece of elastic material, and having interlocking spring clamping-flanges, and the chamber E, of the counterbalance-rod L, substantially as shown and described.

8. In a bottom bar for window-shades, an end cap or ferrule consisting of a tubular body having at its outer end an enlargement, as shown, soft material projecting beyond said enlargement, and a support for said soft material resting within the enlargement, substantially as shown and described.

9. In a bottom bar for window-shades, an end cap or ferrule consisting of a tubular body having at its outer end an enlargement, as shown, soft material projecting beyond said enlargement, and a spring-support resting within the enlargement, substantially as shown and described.

10. The combination, with the bottom bar of a window-shade, of a band encircling the same provided with a subjacent recess for the reception of a pendent ring, the band being united to the curtain fabric above the bar by stitching passing through said fabric and around the band, and having shoulders above the stitching, whereby when a strain is put upon the band in lowering the curtain it is prevented from slipping from the bar, substantially as shown and described.

In testimony whereof we affix our signatures in presence of two witnesses.

DAVID STRASSER.
ANDREW H. GERDOM.

Witnesses:
   ALBERT HESSBERG,
   GEORGE KELLY.